US006259917B1

United States Patent
Elzein (10) Patent No.: US 6,259,917 B1
(45) Date of Patent: Jul. 10, 2001

(54) APPARATUS AND METHOD FOR DERIVING A CURRENT NETWORK LOCATION FROM PREVIOUSLY VISITED NETWORKS AND MOVEMENTS BETWEEN THE PREVIOUSLY VISITED NETWORKS

(75) Inventor: Hadi Elzein, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/208,802

(22) Filed: Dec. 9, 1998

(51) Int. Cl.[7] .................................................. H04Q 7/20
(52) U.S. Cl. ........................ 455/435; 455/456; 455/450; 455/552
(58) Field of Search .................................. 455/434, 438, 455/414, 405, 31.3, 433, 456, 457, 435, 436, 432, 458, 450, 552

(56) References Cited

U.S. PATENT DOCUMENTS

| | | | |
|---|---|---|---|
| 4,737,978 | * 4/1988 | Burke et al. | 455/438 |
| 4,876,738 | * 10/1989 | Selby | 455/435 |
| 4,916,728 | 4/1990 | Blair | 455/455 |
| 5,153,902 | * 10/1992 | Buhl et al. | 455/414 |
| 5,159,625 | 10/1992 | Zicker | 455/432 |
| 5,390,234 | * 2/1995 | Bar-Noy et al. | 455/456 |
| 5,408,683 | * 4/1995 | Ablay et al. | 455/433 |
| 5,442,806 | 8/1995 | Barber et al. | 455/435 |
| 5,517,677 | 5/1996 | Moon | 455/161.1 |
| 5,519,758 | * 5/1996 | Tabbane | 455/405 |
| 5,568,153 | 10/1996 | Béliveau | 342/357.1 |
| 5,586,338 | 12/1996 | Lynch et al. | 455/433 |
| 5,640,675 | 6/1997 | Pinault et al. | 455/434 |
| 5,649,289 | * 7/1997 | Wang et al. | 455/31.3 |
| 5,734,980 | 3/1998 | Hooper et al. | 455/434 |
| 5,754,542 | 5/1998 | Ault et al. | 370/342 |
| 5,761,618 | 6/1998 | Lynch et al. | 455/419 |
| 5,784,693 | 7/1998 | Barber et al. | 455/434 |
| 5,787,358 | 7/1998 | Takahashi | 455/512 |
| 6,169,899 | * 1/2001 | Havinis et al. | 455/433 |

* cited by examiner

Primary Examiner—Nay Maung
Assistant Examiner—Charles Craver
(74) Attorney, Agent, or Firm—Crosby, Heafey, Roach & May (57) ABSTRACT

An apparatus and method is provided for deriving the current network location of a cellular phone within a Cellular Mobile Telephone System. The cellular phone stores its previous network locations and links defining its movement between the previous network locations in a memory. Upon start-up, the cellular phone processes the stored data such that the most recently visited network location is searched for service. If no service is found, the cellular phone searches for service in network locations that are linked to the most recently visited network location. If service is still not found, the cellular phone continues with a linear search or a geographical search through the previously visited network locations. While searching a selected network location, the cellular phone scans the frequency channels in the selected network from the most utilized channel to the least utilized channel or from the most recently utilized channel to the earliest utilized channel. If no service is found on the utilized channels, the cellular phone searches for service on channels in the selected network location that have not been previously utilized by the cellular phone.

39 Claims, 7 Drawing Sheets

| SID$_1$ - NID$_1$ - channels 25, 50, 75 |
| SID$_1$ - NID$_2$ - channels 10, 14, 20 |
| SID$_1$ - NID$_3$ - channels 30, 40, 60 |
| SID$_2$ - NID$_1$ - channels 15, 45, 80 |
| SID$_2$ - NID$_2$ - channels 6, 18, 70 |

| SID$_{10}$ - NID$_1$ - channels 8, 35, 42 |
| SID$_{10}$ - NID$_2$ - channels 17, 44, 76 |
| SID$_{10}$ - NID$_3$ - channels 1, 33, 63 |

| SID/NID Pair | Linked SID/NID Pair | Freq. Tag | Time Stamp | Link Direction | Linked SID/NID Pair | Freq. Tag | Time Stamp | Link Direction |
|---|---|---|---|---|---|---|---|---|
| $SID_1, NID_1$ | $SID_1, NID_2$ | 10 | 10/23/98 04:00:00 | unidirectional outward | $SID_2, NID_1$ | 2 | 10/01/98 11:12:00 | unidirectional inward |
| $SID_{13}, NID_1$ | $SID_2, NID_3$ | 4 | 6/5/98 09:30:00 | bidirectional inward | — | — | — | — |
| $SID_2, NID_3$ | $SID_{13}, NID_1$ | 4 | 6/5/98 09:30:00 | bidirectional outward | $SID_8, NID_1$ | 5 | 7/8/98 06:02:00 | unidirectional outward |
| $SID_7, NID_1$ | $SID_6, NID_2$ | 13 | 6/4/98 01:02:00 | unidirectional inward | $SID_9, NID_1$ | 1 | 5/20/98 05:30:00 | bidirectional inward |

FIG. 5

| Channel Number | Time Stamp | Utilization |
|---|---|---|
| 26 | 08/10/98 12:00:00 | 10 |
| 11 | 08/10/98 10:00:00 | 12 |
| 24 | 08/09/98 13:00:00 | 50 |
| 13 | 08/09/98 11:00:00 | 13 |
| 12 | 08/09/98 10:00:00 | 15 |

FIG. 7A

| Channel Number | Time Stamp | Utilization |
|---|---|---|
| 33 | — | — |
| 25 | — | — |
| 9 | — | — |

APPARATUS AND METHOD FOR DERIVING A CURRENT NETWORK LOCATION FROM PREVIOUSLY VISITED NETWORKS AND MOVEMENTS BETWEEN THE PREVIOUSLY VISITED NETWORKS

BACKGROUND OF THE INVENTION

1. Field of the Invention

This invention relates generally to an apparatus and method for selecting a network upon power-up of a cellular phone, and more specifically to an apparatus and method for deriving the current network location of a cellular phone from the previous movement of the cellular phone within a Code-Division Multiple Access (CDMA) Cellular Mobile Telephone System (CMTS).

2. Related Art

Figure 1:
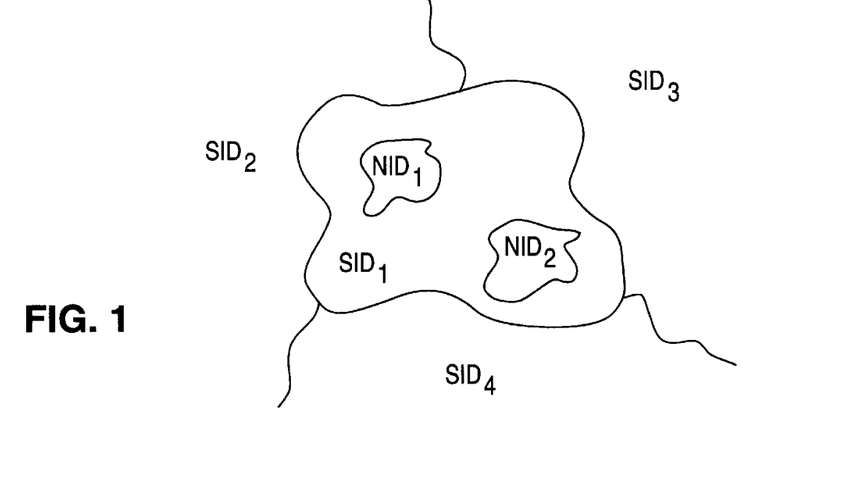
FIG. 1 is a diagrammatic view of a conventional Cellular Mobile Telephone System (CMTS)

A Cellular Mobile Telephone System (CMTS) is typically divided into multiple geographical areas known as systems. The systems are sub-divided into sub-geographical areas known as networks. Each network contains a base station that communicates with all the mobile stations (e.g., cellular phones) within the network via the air. Systems are labeled with an identification called the system identification (SID), and networks within a system are given a network identification (NID). Therefore, as shown in FIG. 1, every network and associated base station can be identified by an SID/NID pair.

A mobile station stores a list of one or more home SID/NID pairs. The mobile station is categorized as roaming if the mobile station's home SID/NID pair does not match the SID/NID pair of the mobile station's current location. The mobile station is categorized as a foreign NID roamer if one of the stored SIDs matches with the current network's SID. The mobile station is categorized as a foreign SID roamer if none of the stored SIDs match the current network's SID. The mobile station, based on this information along with some parameters stored in its permanent memory, makes a determination about the type of service available when roaming.

Upon power-up, the mobile station attempts to register with its home base station in its home SID/NID pair. Traditionally, the mobile station attempts to access the home mobile station by sequentially scanning a list of frequency channels associated with the home SID/NID pair. However, if the mobile station is roaming, the mobile station will not be able to register with its home base station. If this is the case, the mobile station sequentially scans lists of frequency channels associated with foreign networks. The scanning is traditionally carried out in a sequential manner starting with the foreign networks located within the home system and proceeding through a list of foreign SID/NID pairs. As can be appreciated, the sequential scanning of multiple frequency channels within multiple SID/NID pairs can take a considerable amount of time.

One available time reduction method is disclosed in U.S. Pat. No. 5,517,677 to Moon. The Moon patent is directed to a method of weighting a list of networks within a given system. Using the Moon method, a mobile station maintains an adaptive queue of previously accessed networks. By maintaining the adaptive queue the mobile station can scan frequently visited networks in a weighted fashion since the most frequently visited network should have the greatest number of entries in the adaptive queue. In operation, the first network in the adaptive queue is scanned if the mobile station fails to access a home network. If the mobile station is unable to access the first network in the adaptive queue, the mobile station scans a network that is adjacent to the first network. If the mobile station fails to access the adjacent network, the mobile station scans a first network selected from a universal table of networks. If the mobile station fails to access the network from the universal list of networks, the mobile station repeats its scan of the home network. If the repeated scan fails, the mobile station scans the second network in the adaptive queue of networks. If the scan fails, the mobile station scans a network adjacent to the second network. If the scan fails, the mobile station attempts to access the second network on the universal table. This cyclic method is repeated until a network is accessed or until all the networks on the universal table are scanned.

Although the Moon method is an improvement over the conventional sequential scanning of networks, the Moon method has a number of drawbacks. One drawback is that the scanning sequence in the Moon method only attempts to access a single frequency channel for each scanned network. Another drawback is that the Moon method does not record the network movement of the mobile station. Due to these drawbacks, the scanning sequence in the Moon method can take a considerable amount of time.

In view of the foregoing, it can be seen that there is a need for a method and apparatus that reduces the amount of time that is needed for a mobile station to access a network upon power-up. The present invention provides a method and apparatus to meet this need.

SUMMARY OF THE INVENTION

To address the shortcomings of the available art, the present invention provides an apparatus and method for deriving the current network location of a cellular phone within a Cellular Mobile Telephone System. The cellular phone stores its previous network locations and links defining its movement between the previous network locations in a memory. Upon start-up, the cellular phone processes the stored data such that the most recently visited network location is searched for service. If no service is found, the cellular phone searches for service in network locations that are linked to the most recently visited network location. If service is still not found, the cellular phone continues with a linear search or a geographical search through the previously visited network locations. While searching a selected network location, the cellular phone scans the frequency channels in the selected network from the most utilized channel to the least utilized channel or from the most recently utilized channel to the earliest utilized channel. If no service is found on the utilized channels, the cellular phone searches for service on channels in the selected network location that have not been previously utilized by the cellular phone.

In one advantageous feature of the present invention, a method of selecting a network within a cellular system upon power-up of a mobile station is provided. The method comprising the steps of recording a plurality of previously visited network locations for the mobile station, recording a plurality of links that define the mobile station's movement between the plurality of previously visited network locations, deriving a current network location of the mobile station from the recorded pluralities of previously visited network locations and links, and accessing a channel that serves the derived network location.

In another advantageous feature of the present invention, an apparatus for determining a mobile station's location within a cellular system is provided. The apparatus includes means for recording a plurality of network locations previously visited by the mobile station, means for recording a plurality of links that define the mobile station's movement between the plurality of previously visited network locations, means for deriving a current network location of the mobile station from the recorded pluralities of previously visited network locations and links, and means for accessing a channel that serves the derived network location.

The foregoing and other features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENTS

Figure 2:
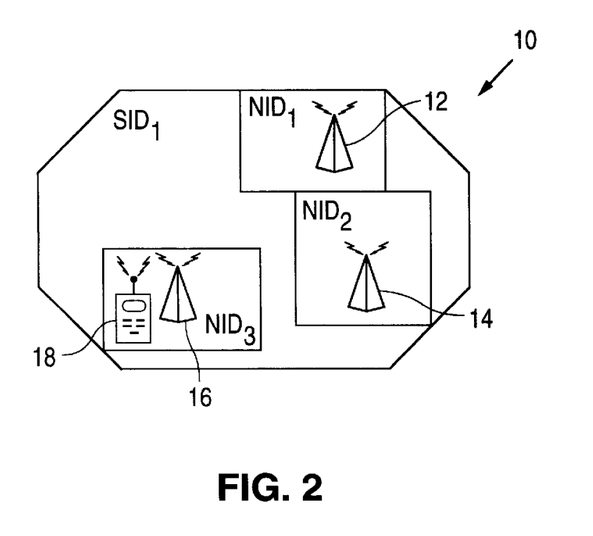
FIG. 2 is a diagrammatic view of a cellular system in which the present invention operates.
Figure 6:
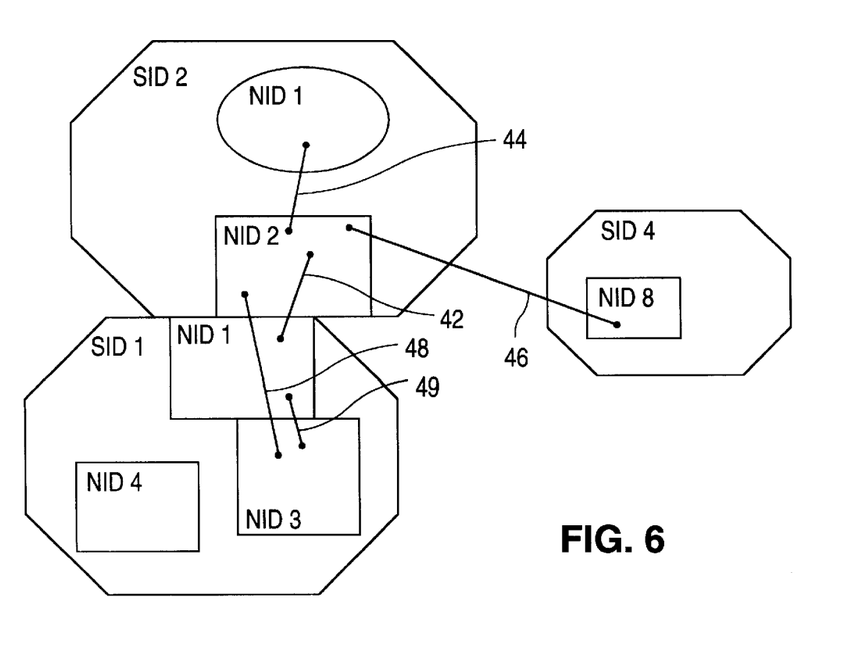
FIG. 6 is a diagrammatic view of links interconnecting SID/NID pairs of the present invention.
Figure 9:
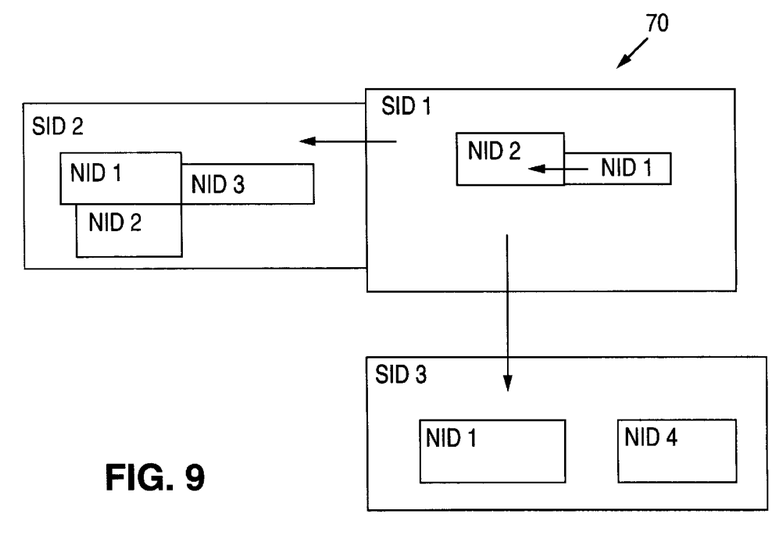
FIG. 9 is a diagrammatic view of another example of a mobile station deriving its location using the method of the present invention.

Referring now to FIG. 2, a cellular system 10 in which the present invention operates is shown. Preferably, cellular system 10 is a Code-Division Multiple Access (CDMA) system in which communications are differentiated from each other by a unique code rather than by a frequency assignment or frequency and time slot assignments. Cellular system 10 includes a plurality of base stations 12, 14, 16 and a mobile station 18 (e.g., cellular phone). Each base station 12, 14, 16 in cellular system 10 is uniquely identified by its SID/NID pair. For example, base station 12 is located in $SID_1/NID_1$, base station 14 is located in $SID_1/NID_2$, and base station 16 is located in $SID_1/NID_3$. Upon power-up, mobile station 18 must determine its location in cellular system 10 in order to communicate with base station 16. In other words, mobile station 14 must determine that it resides in $SID_1/NID_3$ in order to communicate with base station 16. As discussed in greater detail below, mobile station 18 derives its location in system 10, or a plurality of systems as shown in FIGS. 6 and 9, by accessing data stored in a permanent memory and processing the accessed data in accordance with the methods of the present invention.

Figure 3:
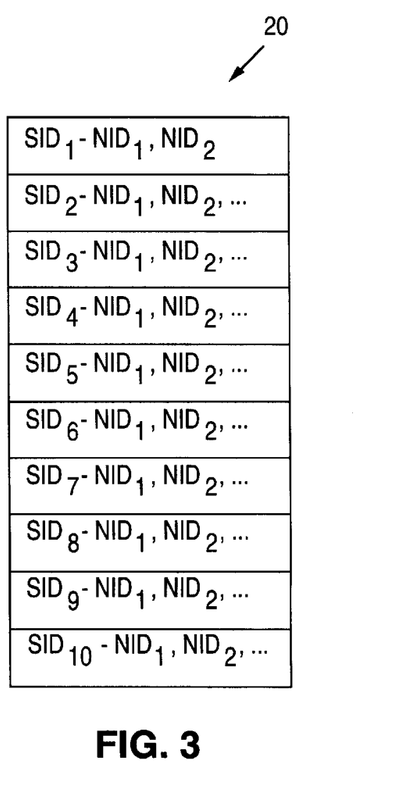
FIG. 3 is a table illustrating a roaming list of the present invention.

Referring now to FIG. 3, a roaming list 20 of preferred systems and networks is stored in the permanent memory of mobile station 18. Roaming list 20 may include, for example, a list of preferred systems ($SID_1$–$SID_{10}$) as well as the networks ($NID_1$, $NID_2$, ...) found within the preferred systems.

Figure 4:
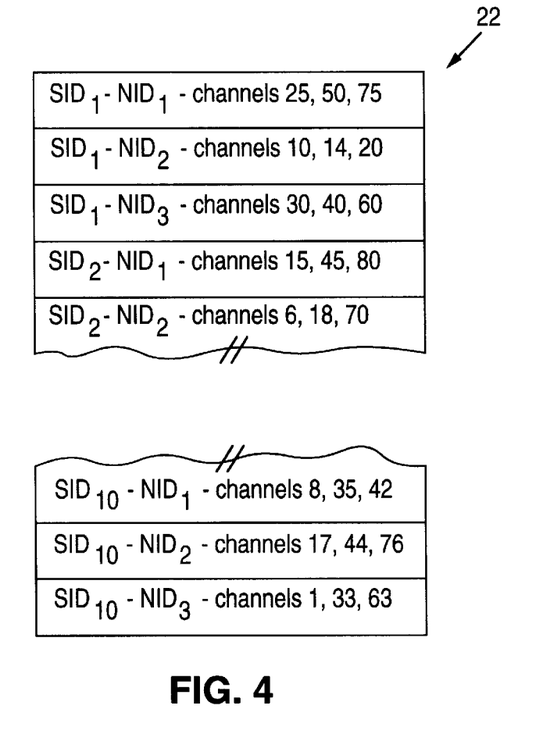
FIG. 4 is a table illustrating a list of preferred frequency channels of the present invention.

Referring now to FIG. 4, a list 22 of preferred frequency channels for each SID/NID pair contained in roaming list 20 (FIG. 3) is stored in the permanent memory of mobile station 18.

Mobile station 18 has no travel history stored in its memory the first time mobile station 18 powers-up. Therefore, at the first power-up, mobile station 18 attempts to derive its network location in the cellular system by sequentially proceeding through the SID/NID pairs in roaming list 20 (FIG. 3) and scanning the preferred frequency channels in list 22 (FIG. 4) for a selected SID/NID pair. The scanning process continues until a communication with a base station occurs over a channel associated with one of the preferred SID/NID pairs or until all of the preferred SID/NID pairs, and associated channels, are scanned. If all the preferred SID/NID pairs are scanned and mobile station 18 has not communicated with a base station, the mobile station 18 informs a user that the SID/NID determination has failed.

Figure 5:
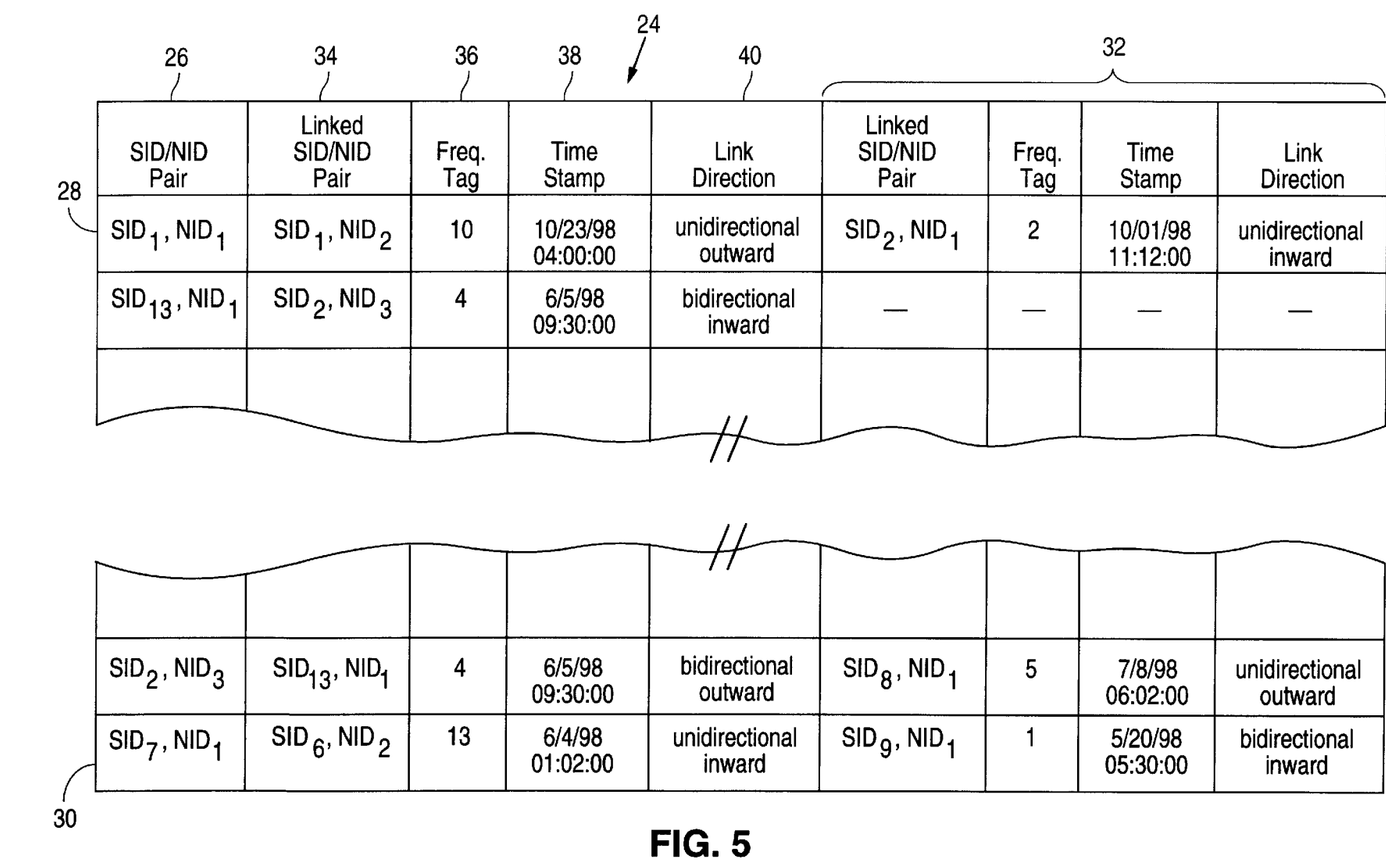
FIG. 5 is a global table containing a list of accessed SID/NID pairs and interconnecting links of the present invention.

Referring now to FIG. 5, a global table 24 is stored in the permanent memory of mobile station 18. Global table 24 includes a listing 26 of recently accessed SID/NID pairs. Listing 26 arranges the pairs from the most recently accessed SID/NID pair 28 to the earliest accessed SID/NID pair 30. Listing 26 preferably has a predetermined finite number of entries (e.g., 100 SID/NID pairs). Once listing 26 reaches its predetermined limit, the earliest accessed SID/NID pair is removed from listing 26 every time a newly accessed SID/NID pair is added to listing 26. It should be noted that listing 26 may include foreign SID/NID pairs that are not found in the roaming list 20 (FIG. 3).

Global table 24 further includes link data 32 associated with each SID/NID pair in listing 26. As described in further detail below, the link data tracks the movement of mobile station 18 between the SID/NID pairs. The link data includes the identity 34 of the linked SID/NID pair, a frequency tag 36 that describes how often the link has been accessed, a time stamp 38 that includes the date and time that the link was last accessed, and a link direction 40. The link direction 40 may be unidirectional or bidirectional, and inward or outward.

The link data 32 is dynamically formed in real time and is updated as mobile station 18 moves among the SID/NID pairs. There may be a predetermined limit on the number of links that can be associated with a listed SID/NID pair. If the number of links exceeds the predetermined limit, a memory manager prioritizes the links and replaces the lowest priority links with new links. Some examples of low priority links are the least accessed and oldest external links, and the least accessed and oldest internal links. It should be noted that any SID/NID pair in listing 26 cannot be linked to an SID/NID pair that is not in listing 26.

Although not shown in global table 24, the links between the SID/NID pairs are classified as follows. Links connecting adjacent networks within the same system are Adjacent Internal Links. Links connecting adjacent networks within different systems are Adjacent External Links. Links connecting adjacent networks within a foreign system are Adjacent Internal Foreign Links. Links connecting adjacent networks within different foreign systems are Adjacent External Foreign Links.

If mobile station 18 powers-up on a system that is different than the system that mobile station 18 powered-down on, the link interconnecting the two systems is further classified as being a Virtual Link. The Virtual Link specifies the NID of the system that mobile station 18 powered-up in but does not specify the NID of the system that mobile station 18 powered-down in. If the adjacency between the two systems is later confirmed the Virtual Link will be re-classified as an Adjacent Link.

When a user powers down mobile station 18 in one system and powers up mobile station 18 in another system the link is characterized as being external. If, in addition, mobile station 18 powers up on a foreign system then the link is characterized as being foreign and external. If mobile station 18 moves from one network to another network in the same system during one power-up cycle, the link between the two networks is characterized as being internal.

Referring now to FIG. 6, examples of linked SID/NID pairs are shown. Link 42 indicates that mobile station 18 moved from $SID_1/NID_1$, to $SID_2/NID_2$. Link 42 is characterized as being adjacent and external, i.e, link 42 interconnects two networks that are adjacent to each other but reside in different systems. Link 44 indicates that mobile station 18 moved from $SID_2/NID_2$ to $SID_2/NID_1$. Link 44 is characterized as being virtual adjacent and internal, i.e, link 44 interconnects two networks that may be adjacent to each other and reside in the same system. Link 46 indicates that mobile station 18 moved from $SID_2/NID_2$ to $SID_4/NID_8$. Link 46 is characterized as being virtual adjacent and external, i.e, link 46 interconnects two networks that may be adjacent to each other and reside in different systems. Link 48 indicates that mobile station 18 moved from $SID_2/NID_2$ to $SID_1/NID_3$. Link 48 is characterized as being virtual adjacent and external, i.e, link 48 interconnects two networks that may be adjacent to each other and reside in different systems. Link 49 indicates that mobile station 18 moved from $SID_1/NID_1$ to $SID_1/NID_3$. Link 49 is characterized as being adjacent and internal, i.e., link 49 interconnects two adjacent networks in the same system.

Figures 7A, 7B, 8:
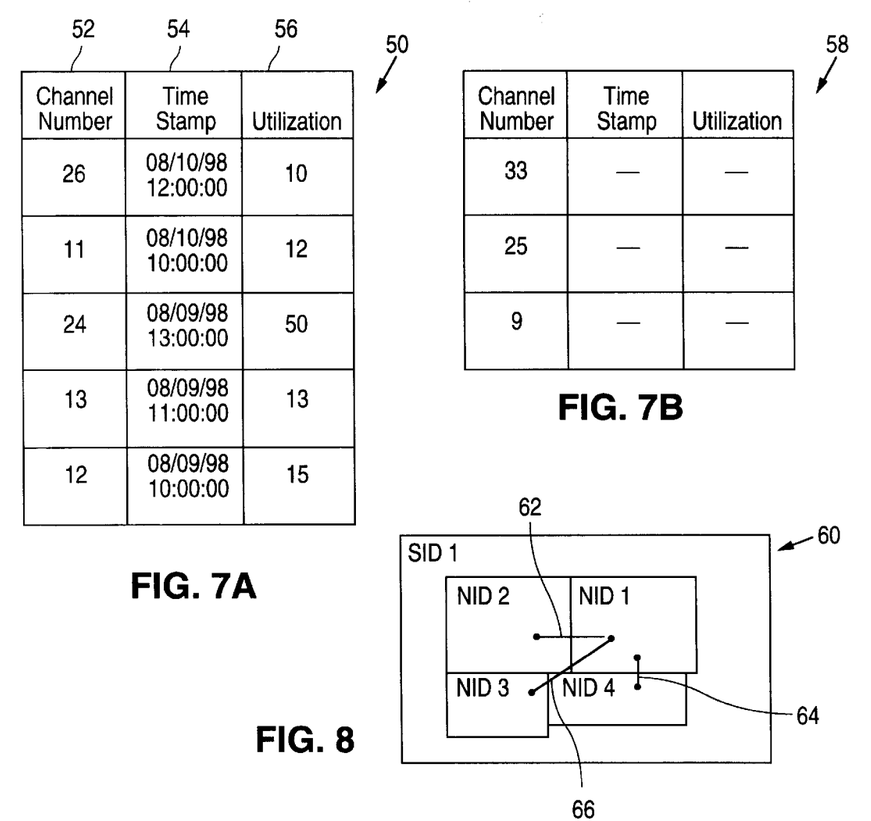
FIG. 7A is a table illustrating a frequency channel history list of the present invention.
FIG. 7B is a table illustrating an unused frequency channel list of the present invention.
FIG. 8 is a diagrammatic view of one example of a mobile station deriving its location using the method of the present invention.

Referring now to FIG. 7A, a channel history list 50, for each SID/NID pair listed in the global table 24 (FIG. 5), is stored in the permanent memory of mobile station 18. Channel history list 50 contains records for every channel accessed in a specific SID/NID pair. Each record contains a channel number 52, a time stamp 54 indicating the last time the channel was accessed, and utilization data 56 that indicates the average utilization of a given channel. The channel history list 50 may be arranged from most recently utilized to earliest utilized (as shown in FIG. 7A) or may be arranged from most often utilized to least often utilized. The time stamp and utilization data is updated every time mobile station 18 visits a given SID/NID pair.

The average utilization of a channel is derived, and updated, using the following equations:

Average Utilization=(Channel Utilization+Previous Average Utilization)/2

Channel Utilization=(SUM(t)/T(total))*100

Wherein "t" is equal to the time spent on the channel for a specific SID/NID pair, and "T" is equal to the total time spent in the specific SID/NID pair the last time mobile station 18 was powered up.

Referring now to FIG. 7B, in conjunction with FIG. 7A, a list 58 of unused channels for a specific SID/NID pair is also stored in the permanent memory of mobile station 18. List 58 contains frequency channels that have not been utilized by mobile station 18 when mobile station 18 traveled in the selected SID/NID pair. As described in further detail below, mobile station 18 initially scans the channel history list 50 (FIG. 7A) after power-up. However, if mobile station 18 is unable to communicate with the base station over one of the previously utilized channels, then mobile station 18 scans the unused channel frequencies stored on list 58. If a channel on list 58 is utilized, the channel is added to the channel history list 50 (FIG. 7A) and deleted from list 58.

Referring now to FIG. 8, one example of location derivation using the method of the present invention is shown. In this example mobile station 18 is deriving its location in a single system 60 having a number of linked networks. If mobile station 18 powered-down in $SID_1/NID_1$, on power-up, mobile station 18 initially scans the frequency channels contained in channel history list 50 (FIG. 7A) in an attempt to communicate with a base station residing in $SID_1/NID_1$. If the communication attempt fails, mobile station 18 scans the frequency channels contained in unused channel list 58 (FIG. 7B) in an attempt to communicate with the base station residing in $SID_1/NID_1$. If this communication attempt also fails, mobile station 18 searches global table 24 (FIG. 5) to determine which SID/NID pairs are linked to $SID_1/NID_1$. Assuming that the global table indicates that $SID_1/NID_4$ and $SID_1/NID_2$ are linked to $SID_1/NID_1$ (links 62 and 64), mobile station 18 may select either the most recently visited SID/NID pair or the most frequently visited SID/NID pair. If, after scanning the frequency channels found in lists 50 (FIG. 7A) and 58 (FIG. 7B), mobile station 18 detects no service from the selected SID/NID pair (e.g., $SID_1/NID_4$), mobile station 18 selects the next SID/NID pair (e.g., $SID_1/NID_2$) from the global table 24 and scans the corresponding frequency channels found in lists 50 (FIG. 7A) and 58 (FIG. 7B). If no service is detected, mobile station 18 scans the frequency channels of any networks that are adjacent to the previously scanned networks and reside in the same system. In the case of FIG. 8, mobile station 18 will scan $SID_1/NID_3$ and will create a link 66 between $SID_1/NID_1$ and $SID_1/NID_3$ if service is found in $SID_1/NID_3$.

Referring now to FIG. 9, another example of location derivation using the method of the present invention is shown. In this example mobile station 18 is deriving its position in multiple systems 70 and SID/NID pairs. More particularly, mobile station 18 is geographically searching multiple systems 70 that do not have any linked SID/NID pairs. Multiple systems 70 includes $SID_1$ ($NID_1$ and $NID_2$), $SID_2$ ($NID_1$, $NID_2$, and $NID_3$), and $SID_3$ ($NID_1$ and $NID_4$). if mobile station 18 powered-down in $SID_1/NID_1$, on power-up, mobile station 18 initially scans the frequency channels in $SID_1/NID_1$ as previously discussed. If mobile station 18 does not detect service in $SID_1/NID_1$, mobile station 18 geographically searches the multiple systems 70 as follows. First, mobile station 18 searches for service in networks that are internally adjacent to $SID_1/NID_1$, i.e., $SID_1/NID_2$. Next, if no service is found, mobile station 18 searches for service in SID/NID pairs that are externally adjacent to $SID_1/NID_1$, i.e., $SID_2$ $NID_1$, $NID_2$, and $NID_3$). Afterwards, if no service is found in the externally adjacent SID/NID pairs, mobile station 18 searches for service in SID/NID pairs that are virtually externally adjacent to $SID_1/NID_1$ i.e., $SID_3$ ($NID_1$ and $NID_4$).

If service is still not detected, mobile station 18 may continue searching for service in SID/NID pairs using one of two methods. First, sequentially searching each remaining SID/NID pair in global table 24 (FIG. 5). Second, selecting the next most recently visited SID/NID pair in global table 24 (FIG. 5) and repeating the geographical search method of FIG. 9.

Figure 10A:
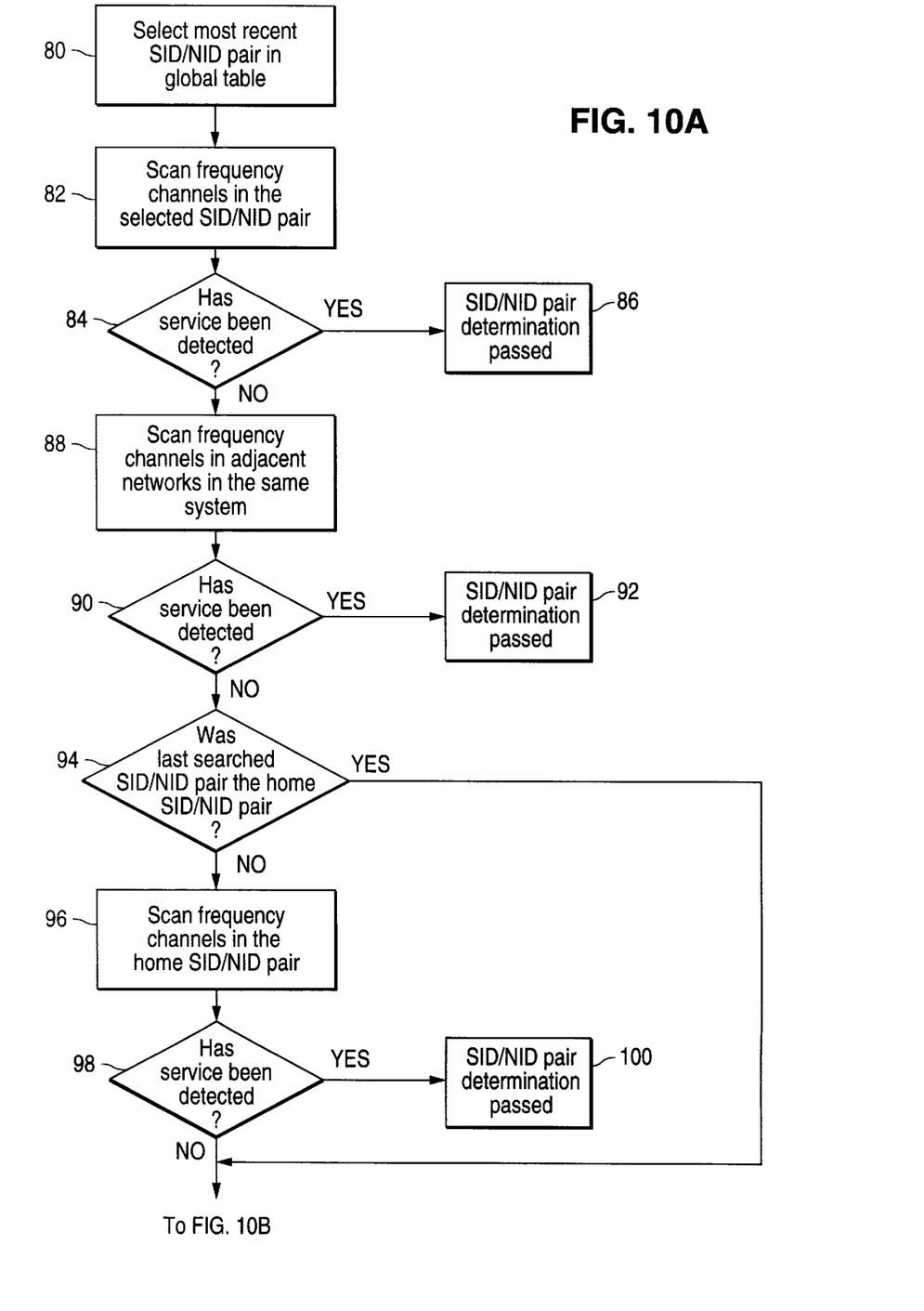
FIG. 10 is a flowchart illustrating a preferred method of SID/NID pair determination of the present invention.
Figure 10B:
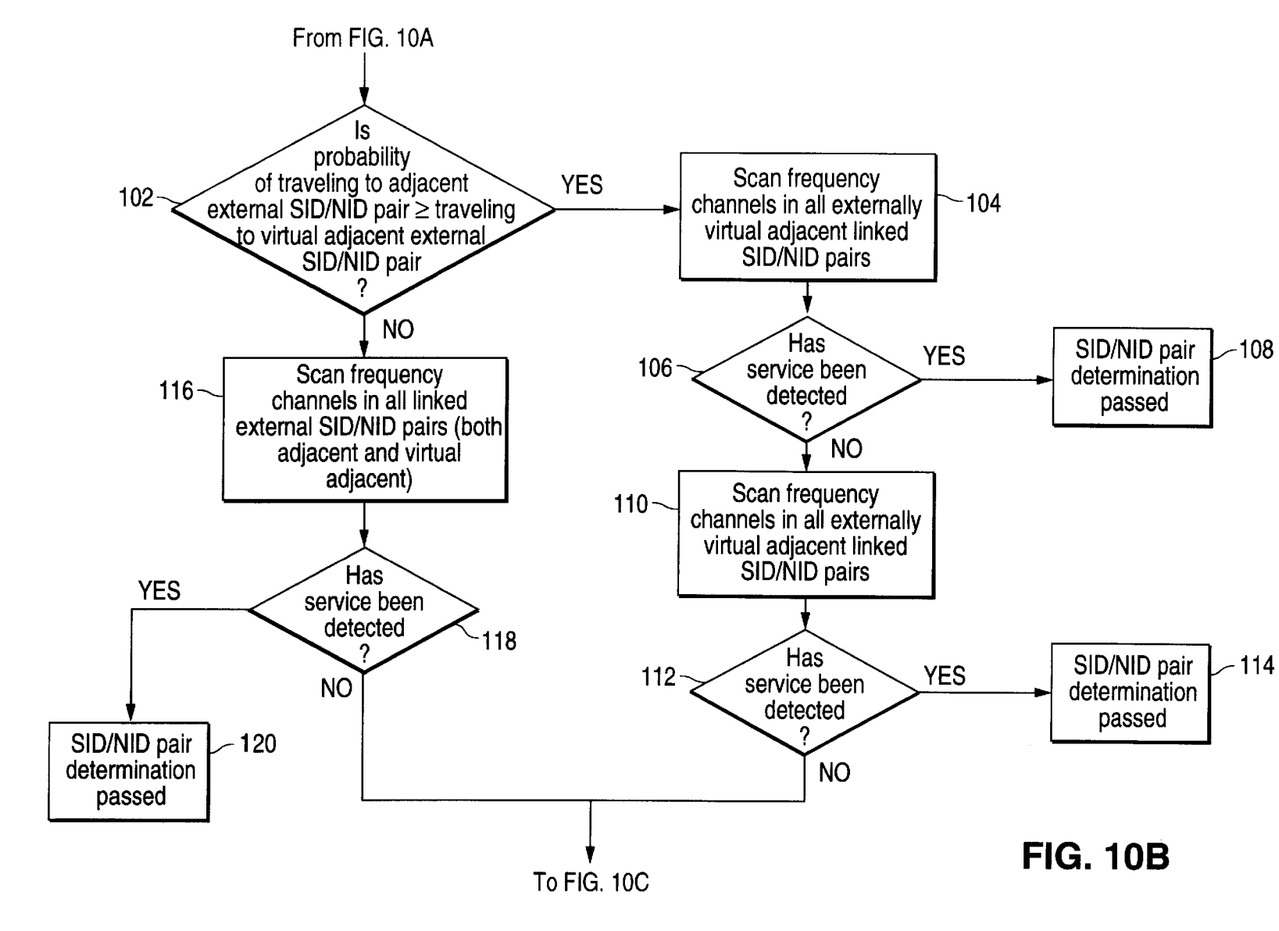
Figure 10C:
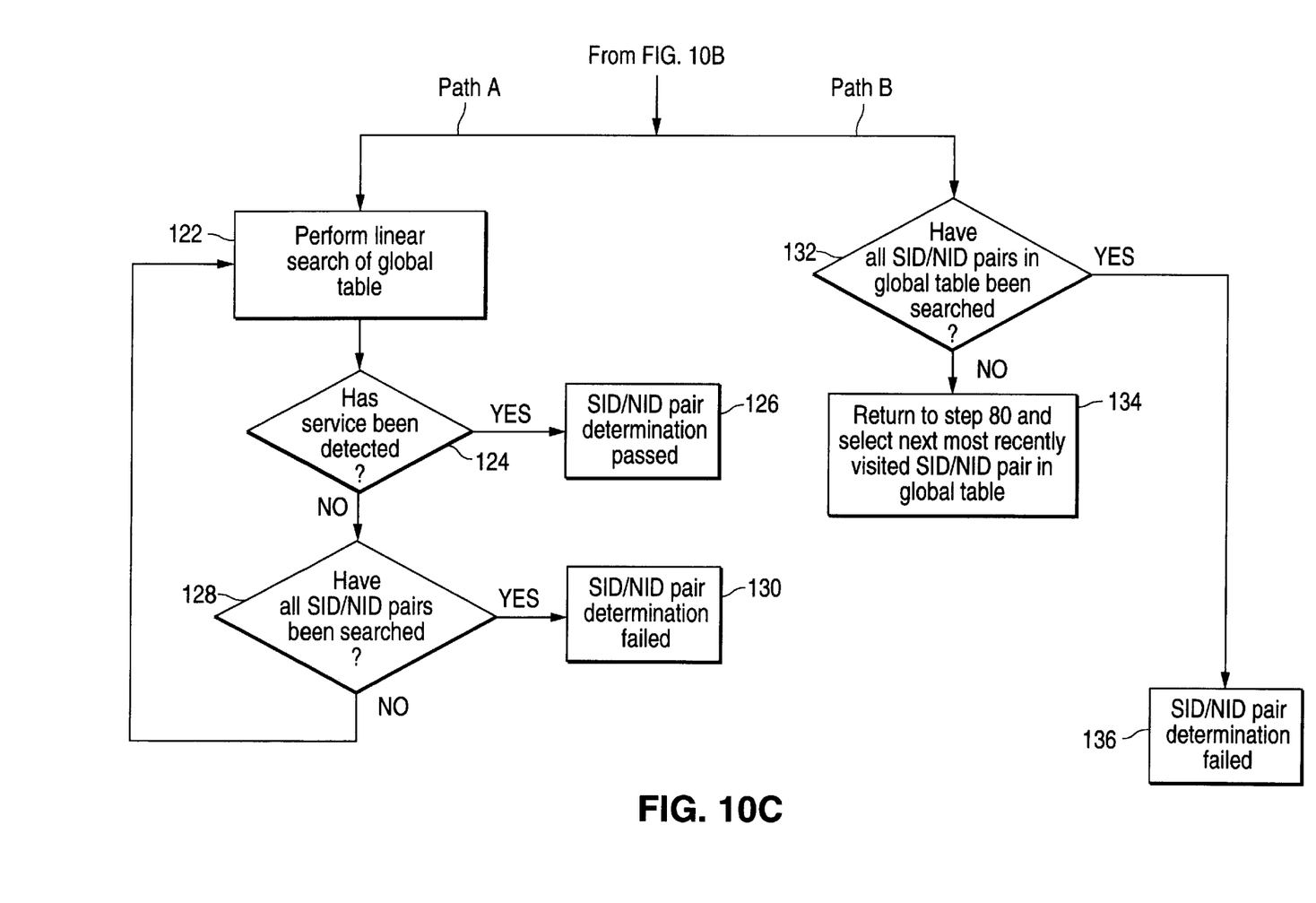

Referring now to FIGS. 10A–10C, a flowchart illustrating a preferred method of the present invention is shown. Initially, at step 80, mobile station 18 selects the most recent SID/NID pair stored in global table 24 (FIG. 5). Next, at step 82, mobile station 18 searches for service in the selected SID/NID pair by scanning the frequency channels in the selected SID/NID pair. Mobile station 18 initially scans the frequency channels in channel history list 50 and, if no service is found, then scans the frequency channels in unused channel list 58. If service is detected, at step 84, mobile station 18 informs the user, at step 86, that the SID/NID pair determination (or network location determination) is successfully completed. If service is not detected, at step 84, mobile station 18, at step 88, searches for service in adjacent networks within the same system by scanning the frequency channels in the adjacent networks. Linked internally adjacent networks are initially searched and, if no service is detected, unlinked internally adjacent networks are searched.

If service is detected, at step 90, mobile station 18 informs the user, at step 92, that the SID/NID pair determination is successfully completed. If service is not detected, at step 90, mobile station 18, at step 94, determines if the most recently searched SID/NID pair is the home SID/NID pair(s). If so, mobile station 18 continues to the portion of the flowchart illustrated in FIG. 10B. If not, mobile station 18, at step 96, searches for service in the home SID/NID pair(s) listed in the preferred pair list 20 (FIG. 3). If service is detected, at step 98, mobile station 18 informs the user, at step 100, that the SID/NID pair determination is successfully completed. If service is not detected, at step 98, mobile station 18 continues to the portion of the flowchart illustrated in FIG. 10B.

Turning now to FIG. 10B, mobile station 18, at step 102, determines whether the probability that it has traveled to an externally adjacent SID/NID pair is greater than or equal to the probability that it has traveled to a virtually externally adjacent SID/NID pair. The probability is calculated by dividing the number of times mobile station 18 traveled out of the most recently searched SID/NID pair to an externally adjacent SID/NID pair by the number of times mobile station 18 traveled out of the most recently searched SID/NID pair. For example, if mobile station 18 traveled out of SID1/NID1 ten times, traveling seven times to an externally adjacent SID/NID pair and traveling three times to a virtually externally adjacent SID/NID pair, then the probability that mobile station 18 has currently traveled to an externally adjacent SID/NID pair is 70% and the probability that mobile station 18 has currently traveled to a virtually externally adjacent SID/NID pair is 30%. Therefore, the probability that mobile station 18 has traveled to an externally adjacent SID/NID pair is greater than the probability that mobile station 18 has traveled to a virtually externally adjacent SID/NID pair.

If mobile station 18, at step 102, determines that the probability that it has traveled to an externally adjacent SID/NID pair is greater than or equal to the probability that it has traveled to a virtually externally adjacent SID/NID pair, the mobile station 18, at step 104, searches for service in the linked externally adjacent SID/NID pairs found in global table 24. The search for service may include searching from the most recently visited linked SID/NID pair to the earliest visited linked SID/NID pair, searching from the most frequently visited linked SID/NID pair to the least frequently visited linked SID/NID pair, or some combination of these two searching techniques. If service is detected, at step 106, mobile station 18, at step 108, notifies the user that the SID/NID pair determination is successfully completed.

If service is not detected, at step 106, mobile station 18, at step 110, searches for service in all linked virtually externally adjacent SID/NID pairs found in global table 24. The search for service may include searching from the most recently visited linked SID/NID pair to the earliest visited linked SID/NID pair, searching from the most frequently visited linked SID/NID pair to the least frequently visited linked SID/NID pair, or some combination of these two searching techniques. If service is detected, at step 112, mobile station 18, at step 114, notifies the user that the SID/NID pair determination is successfully completed. If service is not detected, at step 112, mobile station 18 continues to the portion of the flowchart illustrated in FIG. 10C.

If mobile station 18, at step 102, determines that the probability that it has traveled to an externally adjacent SID/NID pair is less than the probability that it has traveled to an virtually externally adjacent SID/NID pair, mobile station 18, at step 116, searches for service in all externally linked SID/NID pairs (adjacent and virtually adjacent) found in global table 24 (FIG. 5). The search for service may include searching from the most recently visited linked SID/NID pair to the earliest visited linked SID/NID pair, searching from the most frequently visited linked SID/NID pair to the least frequently visited linked SID/NID pair, or some combination of these two searching techniques. If service is detected, at step 118, mobile station 18, at step 120, notifies the user that the SID/NID pair determination is successfully completed. If service is not detected, at step 1 8, mobile station 18 continues to the portion of the flowchart illustrated in FIG. 10C.

Turning now to FIG. 10C, mobile station 18 may continue to search for service in one of two ways. First, mobile station 18 may proceed with a linear search as indicated by path "A". Second, mobile station 18 may proceed with the geographical search as indicated by path "B" and previously described in FIGS. 10A and 10B.

If path "A" is followed, mobile station 18, at step 122 performs a linear search of global table 24 (FIG. 5). The linear search includes mobile station 18 sequentially searching for service in each SID/NID pair listed in global table 24. Since mobile station 18 previously searched the most recently visited SID/NID pair in global table 24, mobile station 18 selects the next most recently visited SID/NID pair in global table 24. It should be noted that each SID/NID pair listed in global table 24 will only be searched once for service. If mobile station 18 encounters an SID/NID pair that has already been searched, mobile station 18 will skip the SID/NID pair and proceed to the next SID/NID pair listed in the global table 24. After mobile station 18 scans a SID/NID pair, in step 122, mobile station 18, at step 124, determines if service has been detected in the searched SID/NID pair. If service is detected, at step 124, mobile station 18, at step 126, notifies the user that the SID/NID pair determination is successfully completed. If service is not detected, at step 124, mobile station 18, at step 128, determines if all the SID/NID pairs have been searched. If so, mobile station 18, at step 130, notifies the user that the SID/NID pair determination has failed. If not, mobile station 18 returns to step 122 and selects the next most recently visited SID/NID pair in global table 24 and searches for service.

If path "B" is followed, mobile station 18, at step 132, determines if all the SID/NID pairs in global table 24 have been searched. If so, mobile station 18, at step 136, notifies the user that the SID/NID pair determination has failed. If not, mobile station 18, at step 134, continues to geographically search the SID/NID pairs in table 24 by returning to step 80 and selecting the next most recently visited SID/NID pair in global table 24.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A method of selecting a network within a cellular system upon power-up of a mobile station, the method comprising the steps of:
   recording a plurality of previously visited network locations for the mobile station;
   recording a plurality of links that define the mobile station's movement between the plurality of previously visited network locations;
   deriving a current network location of the mobile station from the recorded plurality of previously visited network locations and the recorded plurality of links; and
   accessing a channel that serves the derived network location;
   wherein:
      said plurality of links are recorded in a table having, for each link, a first station ID, a second station ID, and information characterizing the link between the stations; and
      said characterizing information includes a direction of the link between the stations.

2. The method of claim 1, wherein the step of deriving the current network location comprises the step of:
   linearly searching the recorded plurality of previously visited network locations sequentially from a most recently recorded network location to an earliest recorded network location.

3. The method of claim 2, wherein the step of linearly searching comprises the steps of:
   selecting the most recently recorded network location;
   attempting to access a channel that serves the most recently recorded network location; and
   selecting the next most recently recorded network location if the attempt to access the channel fails.

4. The method of claim 1, wherein the step of deriving the current network location comprises the step of:
   geographically searching the recorded plurality of previously visited network locations sequentially from a most recently recorded network location to an earliest recorded network location.

5. The method of claim 4, wherein the step of geographically searching comprises the steps of:
   selecting the most recently recorded network location;
   attempting to access a channel that serves the most recently recorded network location;
   selecting a network location that is linked to the most recently recorded network location if the attempt to access the channel fails; and
   attempting to access a channel that serves the linked network location.

6. The method of claim 1, wherein the step of deriving the current network location comprises the steps of:
   calculating a probability that the mobile station has traveled to a first network location;
   calculating a probability that the mobile station has traveled to a second network location; and
   selecting the network location having the highest probability.

7. The method of claim 1 further comprising the step of
   recording a list of channels for each network in the cellular system; and
   recording utilization data for each channel.

8. The method of claim 7, wherein the step of accessing the channel comprises the steps of:
   selecting the most utilized channel that serves the derived network location; and
   attempting to access the most utilized channel.

9. The method of claim 8 further comprising the steps of:
   selecting a second most utilized channel that serves the derived network location if the attempt to access the most utilized channel fails; and
   attempting to access the second most utilized channel.

10. The method of claim 7, wherein the step of accessing the channel comprises the steps of:
    selecting the most recently accessed channel that serves the derived network location; and
    attempting to access the most recently accessed channel.

11. The method of claim 10 further comprising the steps of:
    selecting a second most recently accessed channel that serves the derived network location if the attempt to access the most recently accessed channel fails; and
    attempting to access the second most second most recently accessed channel.

12. The method of claim 7 further comprising the step of:
    updating the list of channels for a network after a channel serving the network is successfully accessed.

13. The method according to claim 1, wherein said direction of the link between stations is one of a unidirectional, bidirectional, inward, and outward link.

14. The method according to claim 1, wherein said first station id and said second station id are SID/NID pairs.

15. The method according to claim 1, wherein said table includes a frequency tag that identifies how often each link has been accessed, and a time stamp indicating a date and time of a last access of each link.

16. The method according to claim 1, further comprising the step of:
    recording, for each of said plurality of links, if applicable, information describing each link, as at least one of, (1) adjacent internal links, links connecting adjacent networks within a same system, (2) adjacent external links, links connecting adjacent networks within different systems, (3) adjacent internal foreign links, links connecting adjacent networks within a foreign system, and (4) adjacent external foreign links, links connecting adjacent networks within different foreign systems.

17. The method according to claim 1, further comprising the step of:
    recording, for each of said plurality of links, if applicable, information describing each link, as at least one of, (1) adjacent internal links, links connecting adjacent networks within a same system, (2) adjacent external links, links connecting adjacent networks within different systems, (3) adjacent internal foreign links, links connecting adjacent networks within a foreign system, (4) adjacent external foreign links, links connecting adjacent networks within different foreign systems, and (5) virtual links, links where the mobile station powers-up in a system different than a last system where the mobile station powered-down.

18. The method according to claim 17, further comprising the steps of:
   determining whether any virtual links are between adjacent systems; and
   reclassifying the virtual links determined to be between adjacent systems as adjacent links.

19. The method according to claim 1, further comprising the step of:
   recording, any one of said plurality of links as a virtual link if the mobile station powers-up on a system that is different than the system that the mobile station powered-down.

20. The method according to claim 19, wherein said virtual links specify a NID of the system that the mobile station powered-up in.

21. The method according to claim 1, wherein said step of deriving a current network location of the mobile station comprises the steps of:
   scanning a channel history list for a SID/NID pair that the mobile station powered-down in;
   scanning an unused channel list for a SID/NID pair that the mobile station powered-down in;
   scanning channels linked to the SID/NID pair the mobile station powered-down in; and
   stopping any scanning steps when a channel of the current network location is located.

22. The method according to claim 21, wherein said step of deriving a current network location of the mobile station further comprises the steps of:
   selecting a recently accessed SID/NID pair;
   scanning a channel history list for the selected SID/NID pair;
   scanning an unused channel list for the selected SID/NID pair; and
   scanning channels linked to the selected SID/NID pair.

23. The method according to claim 22, further comprising the step of selecting a next most recently accessed SID/NID pair and repeating said scanning steps.

24. The method according to claim 22, wherein said step of deriving a current network location of the mobile station further comprises the step of:
   scanning frequency channels of adjacent networks.

25. The method according to claim 21, wherein said step of deriving a current network location of the mobile station further comprises the steps of:
   selecting a most often accessed SID/NID pair;
   scanning a channel history list for the selected SID/NID pair;
   scanning an unused channel list for the selected SID/NID pair; and
   scanning channels linked to the selected SID/NID pair;

26. The method according to claim 25, further comprising the step of selecting a next most often accessed SID/NID pair and repeating said scanning steps.

27. The method according to claim 1, wherein said step of deriving a current network location of the mobile station further comprises the steps of:
   searching any of SID/NID pairs or SID/NID pairs linked to SID/NID pairs that the mobile station has most recently accessed, most often accessed, and last powered down in; and
   if no service is found, performing at least one of,
   seaching for service in networks that are internally adjacent to the SID/NID pair the mobile station powered-down in,
   seaching for service in networks that are externally adjacent to the SID/NID pair the mobile station powered-down in, and
   seaching for service in networks that are virtually externally adjacent to the SID/NID pair the mobile station powered-down in.

28. An apparatus for determining a mobile station's location within a cellular system, the apparatus comprising:
   means for recording a plurality of network locations previously visited by the mobile station;
   means for recording a plurality of links that define the mobile station's movement between the plurality of previously visited network locations;
   means for deriving a current network location of the mobile station from the recorded plurality of previously visited network locations and the recorded plurality of links; and
   means for accessing a channel that serves the derived network location;
   wherein:
      said means for recording records said plurality of links in a table having, for each link, a first station ID, a second station ID, and information characterizing the link between the stations; and
      said characterizing information includes means for identifying a direction of the link between the stations.

29. The apparatus of claim 28, wherein the means for deriving the current network location comprises:
   means for linearly searching the recorded plurality of previously visited network locations sequentially from a most recently recorded network location to an earliest recorded network location.

30. The apparatus of claim 29, wherein the means for linearly searching comprises:
   means for selecting the most recently recorded network location;
   means for attempting to access a channel that serves the most recently recorded network location; and
   means for selecting the next most recently recorded network location if the attempt to access the channel fails.

31. The apparatus of claim 28, wherein the means for deriving the current network location comprises:
   means for geographically searching the recorded plurality of previously visited network locations sequentially from a most recently recorded network location to an earliest recorded network location.

32. The apparatus of claim 31, wherein the means for geographically searching comprises:
   means for selecting the most recently recorded network location;
   means for attempting to access a channel that serves the most recently recorded network location;
   means for selecting a network location that is linked to the most recently recorded network location if the attempt to access the channel fails; and
   means for attempting to access a channel that serves the linked network location.

33. The apparatus of claim 28, wherein the means for deriving the current network location comprises:

means for calculating a probability that the mobile station has traveled to a first network location;

means for calculating a probability that the mobile station has traveled to a second network location; and means for selecting the network location having the highest probability.

34. The apparatus of claim 28 further comprising:

means for recording a list of channels for each network in the cellular system; and means for recording utilization data for each channel.

35. The apparatus of claim 34, wherein the means for accessing a channel comprises:

means for selecting the most utilized channel that serves the derived network location; and means for attempting to access the most utilized channel.

36. The apparatus of claim 35 further comprising:

means for selecting a second most utilized channel that serves the derived network location if the attempt to access the most utilized channel fails; and means for attempting to access the second most utilized channel.

37. The apparatus of claim 34, wherein the means for accessing a channel comprises:

means for selecting the most recently accessed channel that serves the derived network location; and means for attempting to access the most recently accessed channel.

38. The apparatus of claim 37 further comprising:

means for selecting a second most recently accessed channel that serves the derived network location if the attempt to access the most recently accessed channel fails; and means for attempting to access the second most second most recently accessed channel.

39. The apparatus of claim 34 further comprising:

means for updating the list of channels for a network after a channel serving the network is successfully accessed.

* * * * *